United States Patent [19]

Ung

[11] Patent Number: 5,594,594
[45] Date of Patent: Jan. 14, 1997

[54] NON-DISTORTED BLIND SPOT MIRROR USING A TRIANGULAR PRISM FOR ALL TYPES OF VEHICLES

[76] Inventor: Ly W. Ung, 315 Dearborn St., Buffalo, N.Y. 14207

[21] Appl. No.: 286,682

[22] Filed: Aug. 5, 1994

[51] Int. Cl.$^6$ .............................. G02B 5/08; G02B 5/26; G02B 5/04
[52] U.S. Cl. .................. 359/855; 359/838; 359/839; 359/833
[58] Field of Search .................... 359/855, 833, 359/837, 866, 831, 864, 865, 867, 871, 872, 838, 839

[56] References Cited

U.S. PATENT DOCUMENTS

| | | | |
|---|---|---|---|
| 1,883,296 | 10/1932 | Johnson | 88/1 |
| 2,514,989 | 7/1950 | Buren | 359/884 |
| 3,619,038 | 11/1971 | Underhill et al. | 359/606 |
| 3,708,222 | 1/1973 | Stern | 359/851 |
| 3,972,601 | 8/1976 | Johnson | 359/866 |
| 4,182,552 | 1/1980 | Feinbloom | 359/866 |
| 4,306,770 | 12/1981 | Marhauer | 359/866 |
| 4,311,363 | 1/1982 | Marsalka et al. | 359/864 |
| 5,245,479 | 9/1993 | Falanga | 359/838 |

Primary Examiner—Paul M. Dzierzynski
Assistant Examiner—Mohammad Y. Sikder
Attorney, Agent, or Firm—John C. Thompson

[57] ABSTRACT

A triangular prism mirror mounted adjacent a driver of a vehicle to enable the driver to view the blind spot area without any distortion of vision. The triangular prism mirror unit has three plane surfaces, the rear surface being blocked. By blocking the rear surface of the prism, the image entering one of the front surfaces will appear on the other front surface. Therefore the triangular prism mirror, when properly mounted, provides a clear vision for the driver of a vehicle giving access to the blind spot area.

6 Claims, 6 Drawing Sheets

PRISM (GLASS)

NON-DISTORTED BLIND SPOT MIRROR USING A TRIANGULAR PRISM FOR ALL TYPES OF VEHICLES

TECHNICAL FIELD

The present invention relates generally to a rear view mirror for vehicles, and more particularly to such a mirror which is provided with a triangular prism utilizing internal reflection to provide a non-distorting view of the driver's blind spot.

BACKGROUND OF THE INVENTION

U.S. Pat. No. 1,883,296 to Johnson discloses a prism mounted to the side of a windshield, which prism is used as an observing instrument for observing traffic ahead of the vehicle.

U.S. Pat. No. 2,514,989 to Buren discloses a plain mirror employed next to the side view mirror, which can be tilted outward to view the blind spot area. It could cause discomfort to the driver's eye such as tilting the mirror in an opposite direction of view. It requires the driver to focus for longer time than necessary to establish the image of the other vehicle.

U.S. Pat. No. 3,151,207 to Moller discloses two plain mirrors employed on top of the rear view mirror inside the vehicle. This type of device does not give adequate blind spot viewing.

U.S. Pat. No. 4,182,552 to Feinbloom discloses in FIG. 3 a plain mirror with a wedge on the back to tilt the mirror outward to view the blind spot area. In FIG. 4 of the Feinbloom patent, which figure is reproduced as FIG. 8 of this application, discloses a prism 4 mounted on a side view mirror in a base out position. The prism serves to deflect the light from the rear of the automobile directly upon the mirror surface of the mirror 3. In this manner the original mirror 3 is employed and the prism alters the light to provide the field of view of the blind spot by bending the light rays.

U.S. Pat. No. 5,245,479 discloses a rear view mirror which also utilizes a prism, this device being similar to the Feinbloom rear view mirror in that a clear prism is mounted on a mirrored surface.

Other forms of rear view mirrors utilizing prisms are well known in the art. For example U.S. Pat. No. 3,708,222 discloses a Fresnel mirror which comprises a plurality of concentric annular prisms. Another rear view mirror is shown in U.S. Pat. No. 3,619,038 which utilizes a prism for a day/night mirror.

In addition to the prior art set forth above, convex mirrors of varying shapes are also employed. One such example is shown in U.S. Pat. No. 4,311,363 to Marsalka et al.

It would suffice to say that while various configurations of mirrors and prism assemblies are depicted in the prior art, these prior art devices distort the field of view or are extremely complicated and require frequent adjustment and maintenance. In addition, non of these devices utilize the internal reflection of a prism.

OBJECTS AND SUMMARY OF THE INVENTION

The object of this invention is to provide a non-distorted Blind Spot Mirror for the driver of any vehicle.

The new design and usefulness of this invention did not come as a surprise. In fact it is from a personal experience in which I was struck by another driver who was unable to see my vehicle in his blind spot area. This brought deep concern to me as I worry about my safety and the safety of others inside every vehicle.

An important object of this invention is to provide the driver with a greater degree of safety.

It is a further object of the present invention to provide the driver with a clear view of the blind spot area without any distortion of the view.

Another object of the present invention is to provide the elderly and handicapped (whose mobility is limited) a way to enable them to view the blind spot area without having to look backward each time they make changes in driving lanes.

Yet another object of the present invention is to provide a device for viewing the blind spot which is simple and inexpensive to implement.

My invention is a Triangular Prism Mirror Unit, which has three plane (or flat) surfaces. The rear surface serves as the base side of the prism. It is this base side of the prism that is required to be blocked with any color variation to allow for internal reflection to perform properly. By blocking the base of the prism the image will appear on one of the two front surfaces. As this serves the entrance surface and the exit surface, it provides a clear non-distorted visual field of view for the driver to have access to said Blind Spot Area. A Triangular Prism can be formed from either a suitable plastic material or it can be fabricated from glass.

The objects set forth above and other objects and advantages of the present invention will be more fully understood after a consideration of the following detailed description taken in conjunction with the accompanying drawings in which preferred modes of the present invention are illustrated.

DETAILED DESCRIPTION OF THE INVENTION

Figure 1:
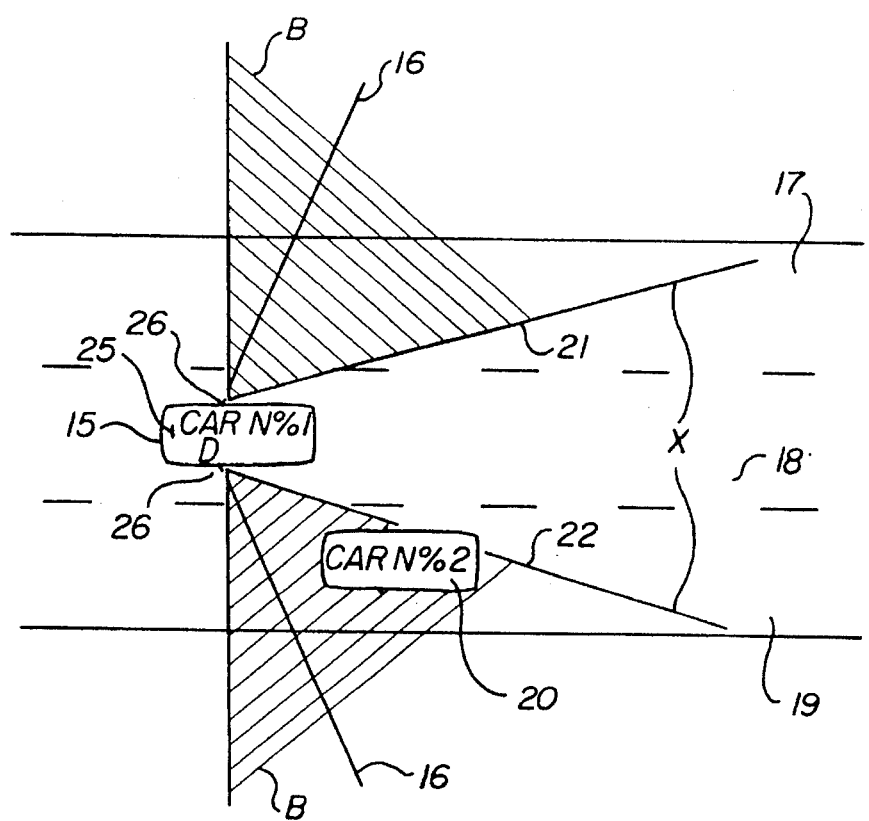
FIG. 1 is a schematic diagram depicting a top view of two vehicles cross-hatched and employed to describe the problem solved by apparatus according to this invention.

The nature of the problem to be solved by this apparatus will be described in detail in conjunction with reference to FIG. 1. A driver of a vehicle normally employs a side view mirror and rear view mirror to view traffic conditions at the rear of his vehicle. FIG. 1 depicts a vehicle 15 (car No. 1) which is located in a middle highway lane 18, which middle lane is bounded by right and left highway lanes 17 and 19, respectively. Another vehicle (car No. 2) is shown in lane 19. As is known, the lanes 17, 18, and 19 may exist on any highway or street, and on such multiple lane highways heavy traffic is quite common.

As can be seen from FIG. 1, the vehicle 20 is behind the vehicle 15. The driver of vehicle 15 is designated by the letter D and he has visual access to the rear view mirror 25 and two conventional right and left side view mirrors 26. The driver D is able to view an area bounded by line 21 and line 22 by use of his mirrors 25 and 26 when properly adjusted by the driver, the area being indicated by X. Typically, the rear view mirror 25 and the two side view mirrors 26 provide a viewing angle of approximately 50 to 60 degrees. However, the driver, without turning, cannot see anything to the right of line 21 nor to the left of line 22 within the shaded areas marked B. These areas B thus define the blind spots or blind areas, and, as is shown in FIG. 1, they are quite substantial. Hence, while Hence, while the driver D is checking from mirror 25 & from mirror 26 he can not see vehicle 20 which is in lane 19, and in the instance shown, to his left. One of the causes of collisions between vehicles is when a vehicle attempts to pass another vehicle while traveling in the same direction. The vehicle 20, if traveling at the same speed as vehicle 15 and located as shown, will be in a "Blind Spot" area and will not be visible in either mirror. Hence, if driver D should wish to make a lane change and enter into lane 19 he might easily cause an accident and there would not be enough time to avoid a collision with vehicle 20. The situation briefly described causes great problems in everyday traffic and does, in fact, cause many accidents. This causes unfortunate injuries to many other people especially when the number of vehicles on the road has increased significantly over the years. Hence, as car 20 moves into this area, it can not be seen by driver D in either the rear view mirror 25 or the side view mirrors 26. If car 20 begins to travel at the same (or relatively at the same) speed as car 15, the driver D will not see car 20 and hence if he decides to change lanes, an accident will occur upon his entering lane 19. The invention presented herein is to overcome the blind spot area and to inform the driver of car 15 as to whether it is safe to move into lane 19 (or lane 17) by allowing him to view the lanes conditions before entering into either lane.

Figure 2A:
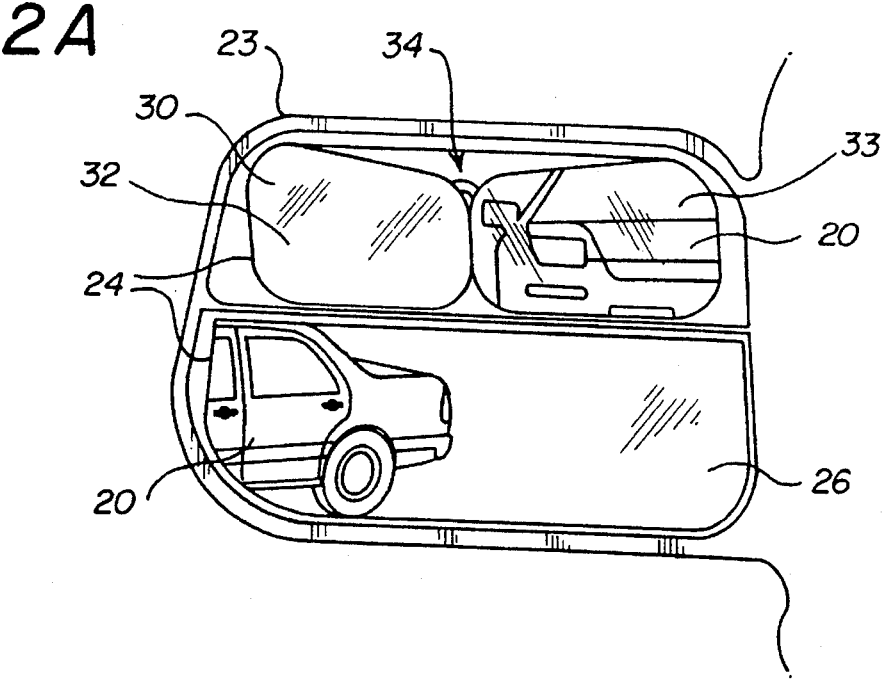
FIG. 2A is a front view showing a continuous image of a vehicle entering the blind spot area when the device of the present invention is mounted on a top position of a conventional mirror.

Referring to FIG. 2A there is shown a typical side view mirror 26 and on top is a prism mirror unit 34 assembly inside the mirror cover 23 both contained separately within a suitable frame or housing 24. The housing 24 is conventionally coupled to an arm or bracket, to the mirror cover 23 which in turn is coupled to both sides of the vehicle. The housing 24 is adjustable in all directions and hence, can be tilted up or down or sideways as is known. The prism mounting unit 34 includes a triangular prism 30 and mounting means for mounting the prism, the mounting means in this embodiment mounting the prism 30 above the side view mirror 26. As is seen in FIG. 2A, a car 20 is viewed in the blind spot area. Hence the front portion of car 20 will be made visible on one side of the prism mirror surface 34 to the driver of car 15 and then the rest of car 20 gradually exits the blind spot area or has passed car 15 by traveling at a faster speed.

Figure 2B:
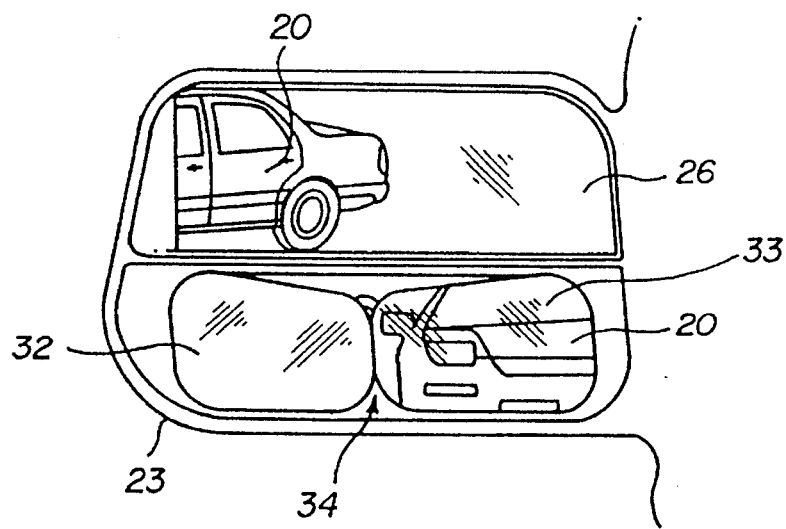
FIG. 2B is a front view showing a vehicle entering the blind spot area when the device of the present invention is mounted at a bottom position of a conventional mirror.

FIG. 2B shows an alternate embodiment of a configuration which will also operate according to FIG. 2A. A prism mirror unit 34 is positioned at the bottom of the side view mirror 26.

Figure 3:
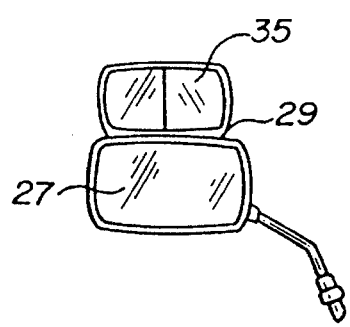
FIG. 3 is a front view of an alternate design with a rear view mirror of a motorcycle.

Referring to FIG. 3 there is shown an alternate embodiment of a motorcycle version, on top of a motorcycle rear view mirror 27 is the prism mirror unit 35 assembly inside the mirror cover 29. Both the rear mirror 27 and said prism mirror unit 35 contained separately within a suitable frame inside the mirror cover 29, which in turn is attached to the handle bar of the motorcycle. It is understood that new motorcycles, or those yet to be manufactured, can integrate structures as indicated above.

Figure 4A:
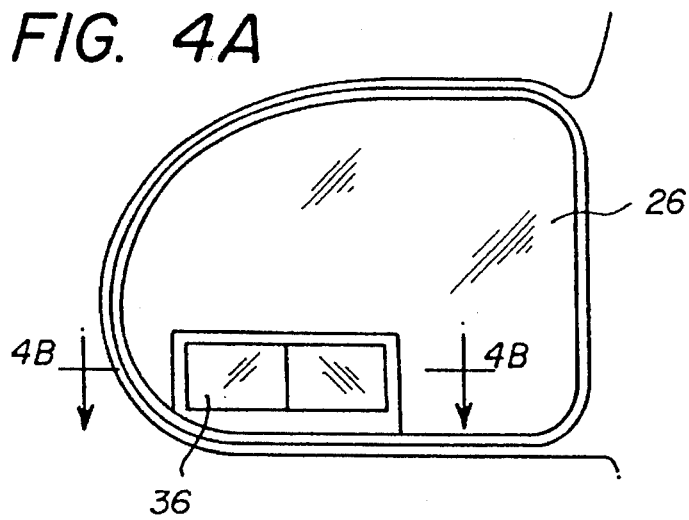
FIG. 4A is a perspective view of a smaller, modified stick-on version of this invention.

Referring to FIG. 4A a modified stick-on version of a prism mirror attachment unit 36 and the conventional side view mirror 26 is shown. A mirror 26 which has planar or flat mirror and the prism mirror attachment unit 36 is positioned on the side view mirror 26 as is shown on the fig.

Figure 4B:
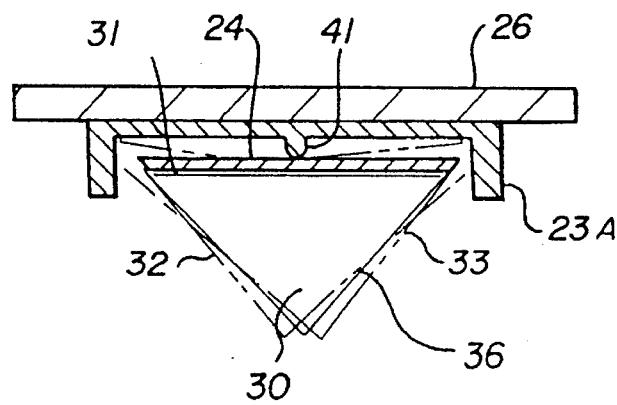
FIG. 4B is a top view showing the prism mirror attachment unit assembly of FIG. 4A, this view being taken generally along the line 4B—4B in FIG. 4A.

Referring to FIG. 4B there is shown a top view of the stick-on version assembly 36 of FIG. 4A, the stick-on version including a mirror cover 23 stuck on mirror 26. The housing is in turn coupled to the cover by fulcrum 41. The housing 24 in turn is clamped or contained on the rear side 31 or the base side of a prism 30 & the two front sides 32, 33 serve as the entrance or the exit of the reflecting image. A prism mirror attachment unit 36 may be glued, epoxied, pasted or clamped directly onto the mirror 26, hence, it can also be employed above or below the mirror 26.

Figure 5A:
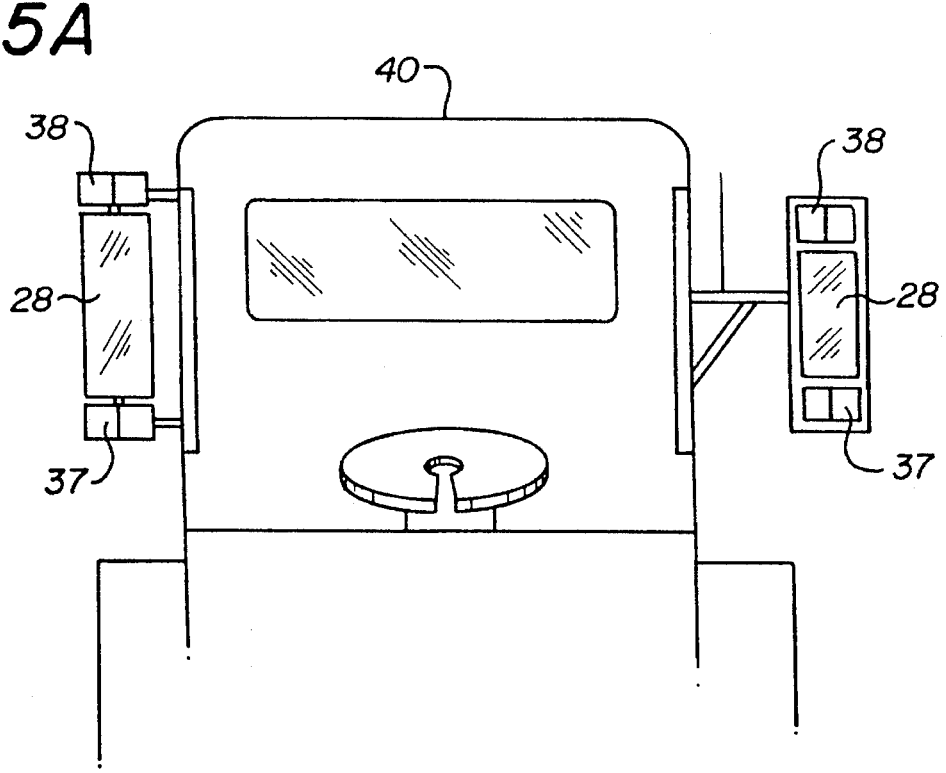
FIG. 5A is a perspective view of the invention with various mounting positions on a commercial vehicle.

Referring to FIG. 5A is shown another embodiment of commercial vehicles, such as trailer truck, buses, recreational vehicle etc. A blind spot area for a truck driver is more significant compared to a conventional passenger vehicle since most trucks carry cargo behind it. By trying to solve the blind spot problem most truck drivers employ the round or square shape of a convex mirror, since there have not been any devices that could solve this problem of distortion. The driver has no alternative choice but to accept the convex mirror for the present time.

It is therefore an object of the present invention to provide a clear view and non-distortion of vision for the driver of a commercial vehicle for a greater degree of safety. Shown on FIG. 5A is a trailer truck 40. To the left of truck 40 is a triangular prism mirror unit 38 which is positioned above the side view mirror 28 and below mirror 28 is triangular prism mirror unit 37. A prism mirror unit 38, which can be employed at an angle of 50° to 65° prism, will help the driver of a truck to view the blind spot area from a short distance away and the prism mirror unit 37 which can be employed at an angle of 40° to 50° prism for viewing the blind spot area between the side view mirror 28 and prism mirror unit 38. A prism mirror unit 37 and prism mirror unit 38 both provide a continuous view of the image of a vehicle after it has entered the blind spot area or passed the side view mirror 28. The on coming vehicle comes into the prism mirror unit 37 and to prism mirror unit 38, therefore allowing the driver to view traffic conditions along both sides of the truck.

Figure 5B:
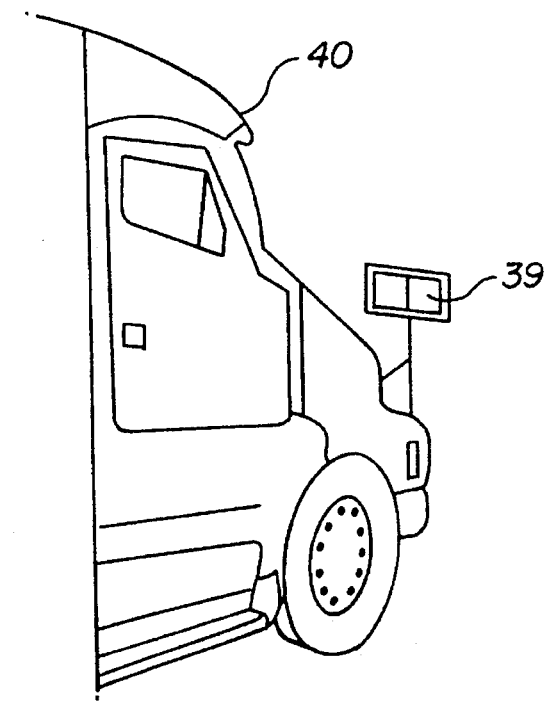
FIG. 5B is a perspective view of still another alternate embodiment.

FIG. 5B offers another embodiment, wherein a prism mirror unit 39 is positioned at the front end of the trailer truck 40. Therefore enabling the driver to view traffic very near the front end of the truck. A prism mirror 39 can be employed either on the left or right side.

Figure 5C:
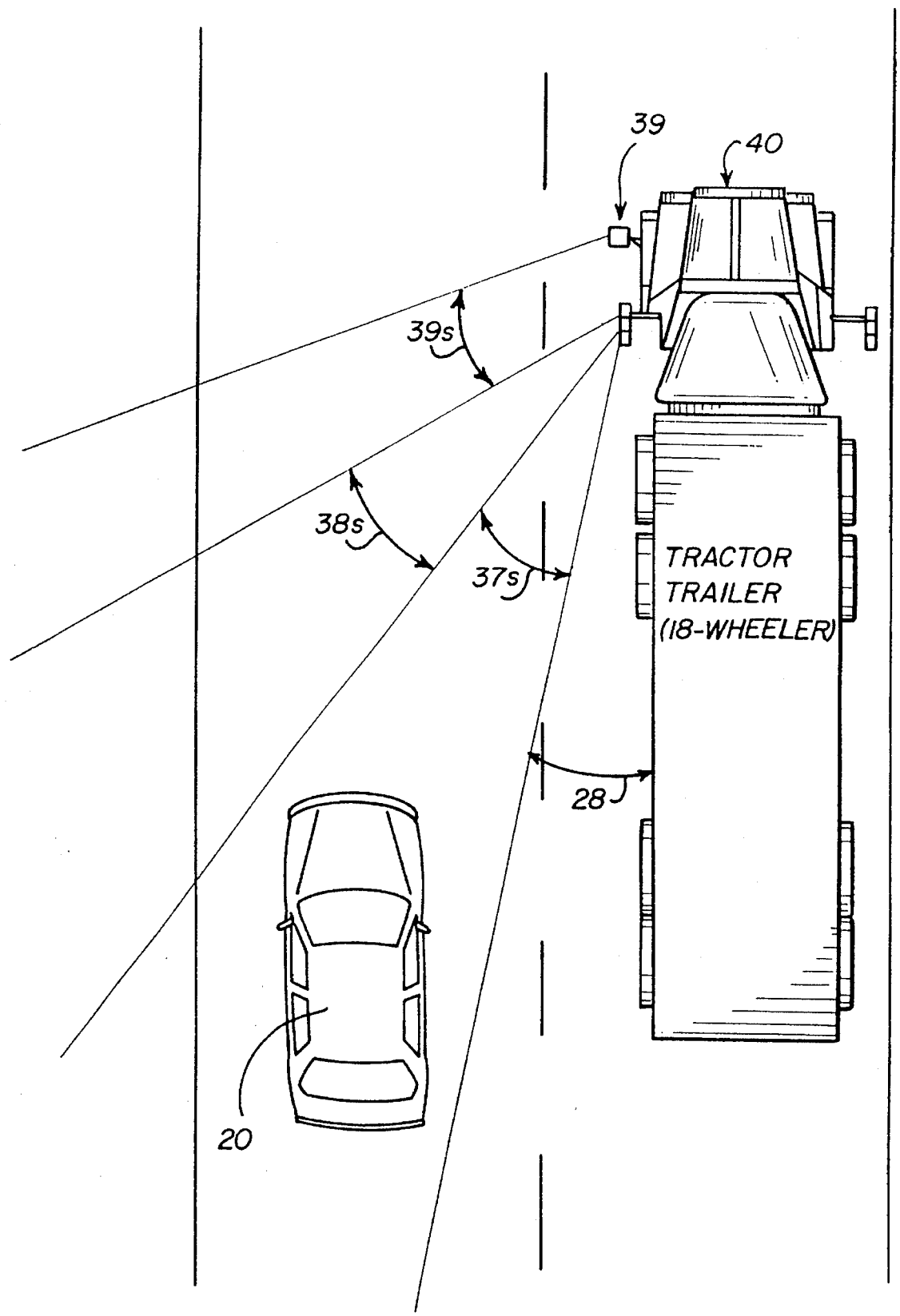
FIG. 5C is a plan view of the invention shown in FIGS. 5A and 5B.

With reference now to FIG. 5C, the shaded area 37s corresponds to the view area of prism mirror 37, when the prism mirror 37 has angles ranging from. 40° to 50°. The shaded area 38s in FIG. 5C corresponds to prism mirror 38 with its angles ranging from 50° to 65° area of coverage. Mirror 39, which is mounted independently toward the front end of a trailer truck, provides for blind spot coverage as shown by the shaded area 39s. Mirrors 28, 37 and 38 work together as a unitary component to provide for a continuous flow of the approaching vehicle 20 from the rear. Thus the regular rear view mirror 28 would pick up the image of the vehicle first, then as the vehicle enters the area 37s, its image will be picked up by mirror 37, and so on.

Figure 6A:
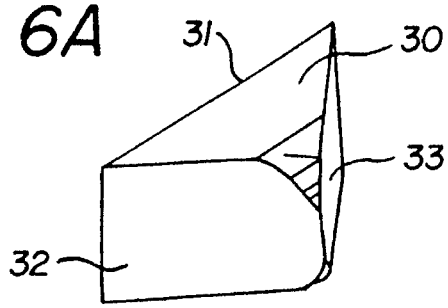
FIG. 6A is a perspective view of a triangular prism which is used in of this invention.

FIG. 6A shows a perspective view of a triangular prism which is the principle of the present invention, including a prism 30 with the rear or base side 31 and the two sides of front surfaces 32, 33 serving as the entrance or the exit surface.

FIGS. 6B to 6G show cross sectional views of a triangular prism which include a prism 30 with the base side 31 and the two sides of a front surface 32, 33 and the light rays lines 51, 52, 53 which indicate the direction of the light traveling in and out of the side surface 32, and 33, when the base side 31 of a prism is blocked.

Figure 6B:
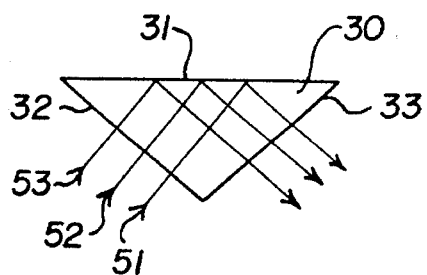
FIGS. 6B to 6G each show a cross-sectional view of a triangular prism, prisms of differing angles and degrees being shown in the different figures.

FIG. 6B is a cross-sectional view of prism 30 in a 40° angle configuration.

Figure 6C:
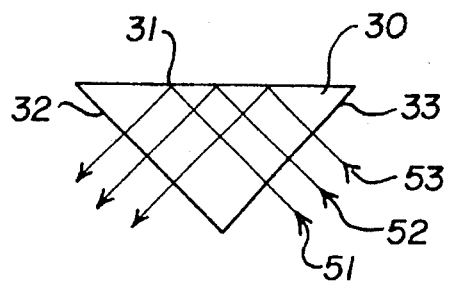

FIG. 6C is a cross-sectional view of prism 30 in a 45° angle configuration.

Figure 6D:
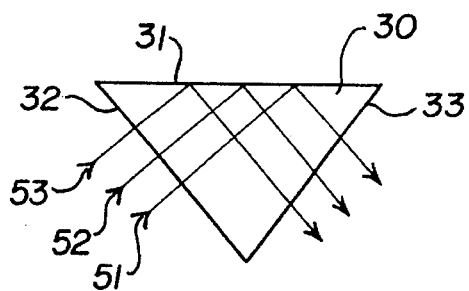

FIG. 6D is a cross-sectional view of prism 30 in a 50° angle configuration.

Figure 6E:
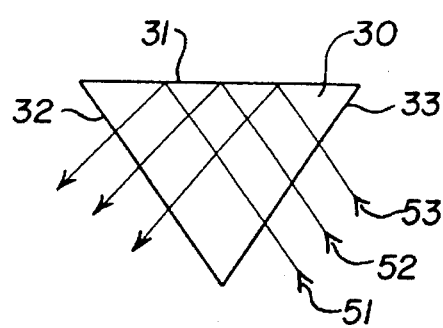

FIG. 6E is a cross-sectional view of prism 30 in 55° angle configuration.

Figure 6F:
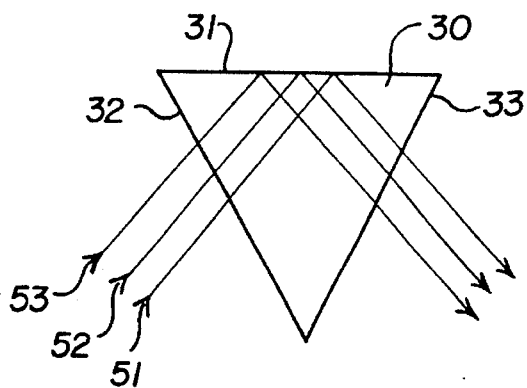

FIG. 6F is a cross-sectional view of prism 30 in a 60° angle configuration.

Figure 6G:
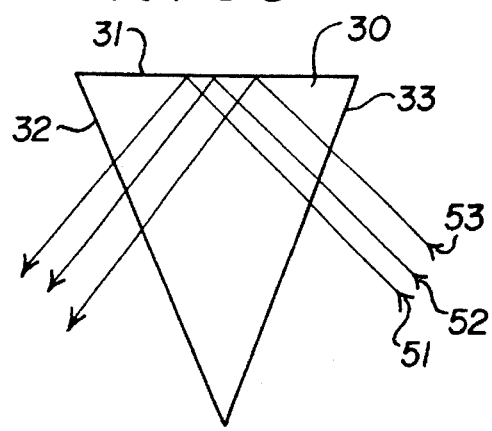

FIG. 6G is a cross-sectional view of prism 30 in a 65° angle configuration.

As indicated above the prism 30 can be constructed from material such as glass, or suitable plastic material. It can also be formed to any size, such large or small, and the sides of a prism 32, and 33 can be formed from any shape, such as rectangle, square, and so on.

It can be seen from FIGS. 6B to 6G that the blind spot prism mirror of this invention relies upon internal reflections. In other word, the rear or base side 31 of the prism is blocked to allow for internal reflection, and light entering one of the front sides 32 or 33 will be internally reflected and exit the other side, thereby giving a non-distorted view.

Figure 7A:
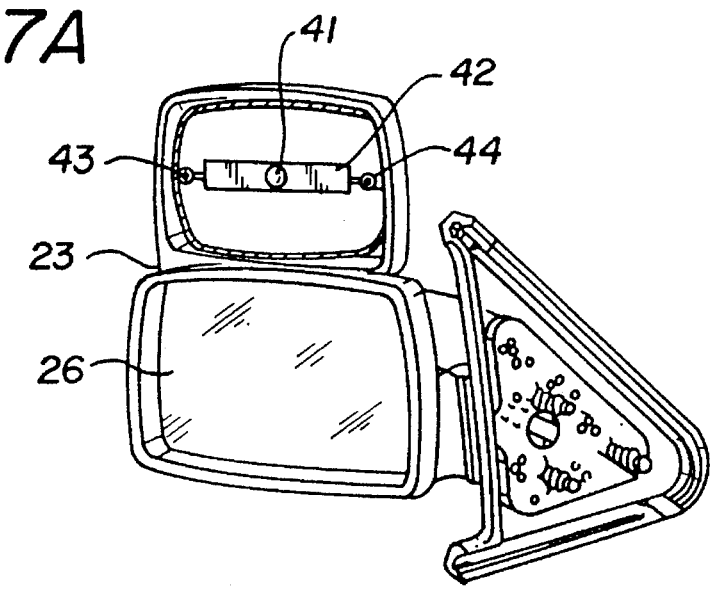
FIGS. 7A and 7B show a fragmentary sectional view of the assembly shown in FIG. 2A.
Figure 7B:
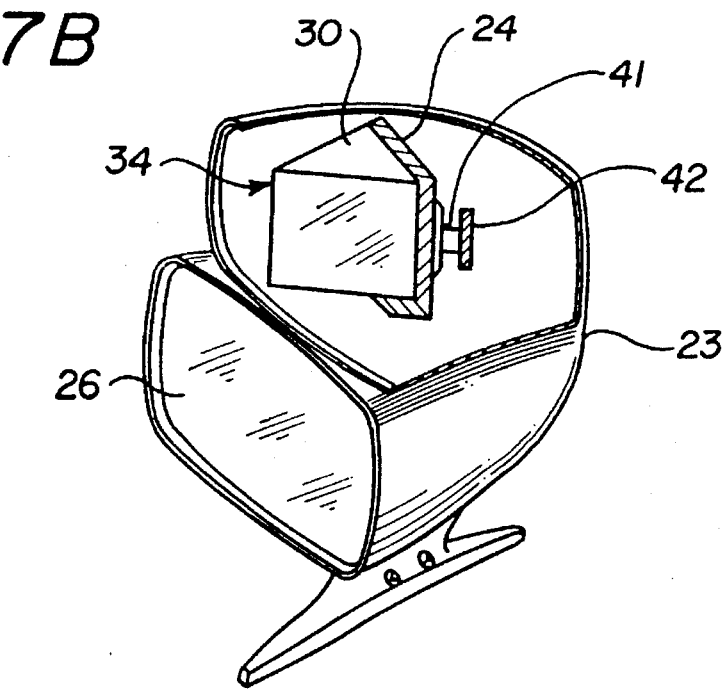
Figure 8:
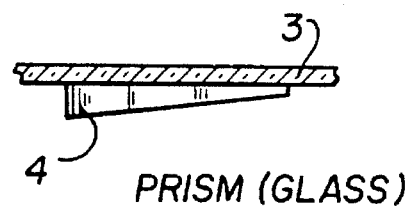
FIG. 8 is a prior art rear view mirror provided with a prism.

FIGS. 7A and 7B show sectional views of the prism mirror unit 34 shown in FIG. 2A. More specifically, FIG. 7A shows a fulcrum 41 located in the middle of support plate 42, screws 43 and 44 connecting the plate 42 to the mirror cover 23. FIG. 7B shows a mirror cover 23 containing both the side view mirror 26 and the prism mirror unit 34.

A prism unit 34 includes the support plate 42 followed by a fulcrum 41 which is connected to the housing 24, (the housing 24 in turn contains the base side of a prism 30 as it is shown in the figure) It will be understood that the embodiments shown in the drawings and described above are merely for illustrative purposes and are not intended to limit the scope of the invention.

The description of this invention is illustrative and explanatory of various changes in sizes, shapes, and materials. It will be understood by those skilled in the art and are deemed to be encompassed within the scope and breadth of the claim presented herein:

What is claimed is:

1. A first non-distorting blind spot prism mirror unit for use in a driven vehicle, said vehicle being provided with a first side view mirror, said first blind spot mirror unit being characterized by:

a first triangular prism having first, second and third plane sides, the first side being blocked causing an image entering the second side to be internally reflected so that it can be viewed from the third side; and first mounting means for mounting the first triangular prism either above, below or forward of the first side view mirror in such a manner that the first triangular prism has the second side facing a blind spot area and the third side facing the driver so that the driver of the vehicle is provided with a clear non-distorted view of the blind spot area not normally visible through the first side view mirror.

2. The invention as set forth in claim 1 further characterized by the provision of a second non-distorting blind spot prism mirror unit having a second triangular prism and second mounting means, the second triangular prism also having three plane sides including a first side which is blocked, the second triangular prism having an angle differing from the first triangular prism, and wherein second mounting means mounts the second triangular prism either above, below or forward of the first side view mirror.

3. The invention as set forth in claim 2 wherein the first mounting means mounts the first triangular prism above the first side view mirror, and wherein second mounting means mounts the second triangular prism below the first side view mirror.

4. The invention as set forth in claim 1 wherein the driven vehicle is provided with a second side view mirror, the first and second side view mirrors being left and right side view mirrors, respectively, the invention further being characterized by the provision of a second non-distorting blind spot prism mirror unit having:

a second triangular prism having first, second and third sides, the first side being blocked causing an image entering the second side to be internally reflected; and second mounting means for mounting the second triangular prism either above, below, or forward of the second side view mirror in such a manner that the driver of the vehicle is provided with a clear non-distorted view of another blind-spot area not normally visible through the first and second side view mirrors.

5. The invention as set forth in claim 4 wherein the driven vehicle is a truck, wherein the first and second triangular prisms are mounted above the first and second side view mirrors, respectively, wherein third and fourth triangular prisms are provided, each of said third and fourth triangular prisms having first, second and third sides, the first side being blocked causing an image entering the second side to be internally reflected, each of the third and fourth triangular prisms having an angle differing from the first and second triangular prisms, respectively, and the third and fourth triangular prisms third and fourth mounting means for mounting on the left and right side view mirrors, respectively.

6. The invention as set forth in claim 5 wherein a fifth triangular prism is provided, the fifth triangular prism being similar to the third triangular prism, and wherein fifth mounting means are provided, the fifth mounting means mounting the fifth triangular prism in front of the side view mirror on the drivers side.

\* \* \* \* \*